(12) United States Patent
Wong et al.

(10) Patent No.: US 10,403,902 B2
(45) Date of Patent: Sep. 3, 2019

(54) HIGH CAPACITY RECHARGEABLE BATTERIES

(71) Applicant: COMPOSITE MATERIALS TECHNOLOGY, INC., Shrewsbury, MA (US)

(72) Inventors: James Wong, Shrewsbury, MA (US); David Frost, Shrewsbury, MA (US)

(73) Assignee: COMPOSITE MATERIALS TECHNOLOGY, INC., Shrewsbury, MA (US)

( * ) Notice: Subject to any disclaimer, the term of this patent is extended or adjusted under 35 U.S.C. 154(b) by 0 days.

(21) Appl. No.: 15/574,121

(22) PCT Filed: May 16, 2016

(86) PCT No.: PCT/US2016/032751
§ 371 (c)(1),
(2) Date: Nov. 14, 2017

(87) PCT Pub. No.: WO2016/187143
PCT Pub. Date: Nov. 24, 2016

(65) Prior Publication Data
US 2018/0287163 A1 Oct. 4, 2018

Related U.S. Application Data

(60) Provisional application No. 62/162,064, filed on May 15, 2015.

(51) Int. Cl.
*H01M 4/74* (2006.01)
*H01M 4/134* (2010.01)
(Continued)

(52) U.S. Cl.
CPC .......... *H01M 4/74* (2013.01); *H01M 4/0404* (2013.01); *H01M 4/134* (2013.01);
(Continued)

(58) Field of Classification Search
CPC ...... H01M 4/74; H01M 4/0404; H01M 4/134; H01M 4/1395; H01M 10/0525;
(Continued)

(56) References Cited

U.S. PATENT DOCUMENTS

| 3,277,564 | A | 10/1966 | Webber et al. | 29/419 |
| 3,379,000 | A | 4/1968 | Webber et al. | 57/139 |

(Continued)

FOREIGN PATENT DOCUMENTS

| CN | 104040764 | 9/2014 | H01M 4/64 |
| JP | 2014-116318 | 6/2014 | H01M 8/18 |

(Continued)

OTHER PUBLICATIONS

"Comparison of battery types" Wikipedia article https://en.wikipedia.prg/wiki/Comparison_of_battery_type, Jul. 8, 2015 (1pg).
(Continued)

*Primary Examiner* — Lingwen R Zeng
(74) *Attorney, Agent, or Firm* — Hayes Soloway P.C.

(57) ABSTRACT

An electrically active electrode material for use with a lithium ion cell, a lithium ion cell, and a method for forming the electrochemically active material electrode material are described. The electrode material is in the form of a sheet or mat formed of a valve metal material formed of filaments of a valve metal not larger than about 10 microns in cross section, and coated with an electrochemically active material such as silicon nanoparticles.

14 Claims, 4 Drawing Sheets

(51) Int. Cl.
  *H01M 4/66* (2006.01)
  *H01M 4/1395* (2010.01)
  *H01M 4/04* (2006.01)
  *H01M 10/0525* (2010.01)
  *H01M 4/38* (2006.01)
  *H01M 4/02* (2006.01)

(52) U.S. Cl.
  CPC ......... *H01M 4/1395* (2013.01); *H01M 4/386* (2013.01); *H01M 4/387* (2013.01); *H01M 4/661* (2013.01); *H01M 4/662* (2013.01); *H01M 10/0525* (2013.01); *H01M 2004/027* (2013.01)

(58) Field of Classification Search
  CPC ........... H01M 2004/027; H01M 4/386; H01M 4/387; H01M 4/661; H01M 4/662
  See application file for complete search history.

(56) References Cited

U.S. PATENT DOCUMENTS

| | | | |
|---|---|---|---|
| 3,394,213 A | 7/1968 | Roberts et al. | 264/174 |
| 3,567,407 A | 3/1971 | Yoblin | 29/191.4 |
| 3,698,863 A | 10/1972 | Roberts et al. | 29/183.5 |
| 3,742,369 A | 6/1973 | Douglass | 317/230 |
| 3,817,746 A | 6/1974 | Tsuei | 75/153 |
| 4,378,330 A | 3/1983 | Verhoeven et al. | 420/432 |
| 4,502,884 A | 3/1985 | Fife | 75/0.5 |
| 4,551,220 A | 11/1985 | Oda | 204/294 |
| 5,034,857 A | 7/1991 | Wong | 361/509 |
| 5,062,025 A | 10/1991 | Verhoeven et al. | 361/509 |
| 5,185,218 A | 2/1993 | Brokman | 204/284 |
| 5,217,526 A | 6/1993 | Fife | 75/229 |
| 5,245,415 A | 9/1993 | Mimura | 358/34 |
| 5,245,514 A | 9/1993 | Fife et al. | 361/529 |
| 5,284,531 A | 2/1994 | Fife | 148/513 |
| 5,306,462 A | 4/1994 | Fife | 419/24 |
| 5,635,151 A | 6/1997 | Zhang et al. | 423/445 |
| 5,869,196 A | 2/1999 | Wong et al. | 428/613 |
| 5,908,715 A | 6/1999 | Liu et al. | 429/217 |
| 5,910,382 A | 6/1999 | Goodenough et al. | 429/218.1 |
| 6,007,945 A | 12/1999 | Jacobs et al. | 429/218.1 |
| 6,143,448 A | 11/2000 | Fauteux et al. | 429/231.8 |
| 6,316,143 B1 | 11/2001 | Foster et al. | 429/218.1 |
| 6,475,673 B1 | 11/2002 | Yamawaki et al. | 429/231.5 |
| 6,524,749 B1 | 2/2003 | Kaneda et al. | 429/231.95 |
| 6,666,961 B1 | 12/2003 | Skoczylas | 204/242 |
| 7,073,559 B2 | 7/2006 | O'Leary et al. | 164/76.1 |
| 7,094,499 B1 | 8/2006 | Hung | 429/231.8 |
| 8,257,866 B2 | 9/2012 | Loveness et al. | 429/223 |
| 8,450,012 B2 | 5/2013 | Cui et al. | 429/209 |
| 8,603,683 B2 | 12/2013 | Park et al. | 429/332 |
| 8,637,185 B2 | 1/2014 | Berdichevsky et al. | 429/218.1 |
| 8,673,025 B1 | 3/2014 | Wong | 29/25.03 |
| 8,722,226 B2 | 5/2014 | Chiang et al. | 429/105 |
| 8,722,227 B2 | 5/2014 | Chiang et al. | 429/105 |
| 8,858,738 B2 | 10/2014 | Wong | 148/527 |
| 8,906,447 B2 | 12/2014 | Zhamu | 427/115 |
| 8,993,159 B2 | 3/2015 | Chiang et al. | 429/209 |
| 9,065,093 B2 | 6/2015 | Chiang et al. | H01M 4/0411 |
| 9,178,208 B2 | 11/2015 | Park et al. | H01M 4/13 |
| 9,397,338 B2 | 7/2016 | Park et al. | H01M 4/623 |
| 2006/0237697 A1 | 10/2006 | Kosuzu et al. | 252/500 |
| 2007/0020519 A1 | 1/2007 | Kim et al. | 429/213 |
| 2007/0031730 A1 | 2/2007 | Kawakami et al. | 429/218.1 |
| 2007/0122701 A1 | 5/2007 | Yamaguchi | 429/218.1 |
| 2007/0148544 A1 | 6/2007 | Le | 429/218.1 |
| 2009/0176159 A1 | 7/2009 | Zhamu et al. | 429/222 |
| 2009/0269677 A1* | 10/2009 | Hirose | H01M 4/134 429/338 |
| 2010/0047671 A1 | 2/2010 | Chiang et al. | 429/50 |
| 2010/0239915 A1 | 9/2010 | Hochgattrerer et al. | 429/231.95 |
| 2010/0255376 A1 | 10/2010 | Park et al. | 429/231.8 |
| 2010/0310941 A1* | 12/2010 | Kumta | H01B 1/04 429/231.95 |
| 2011/0020701 A1 | 1/2011 | Park et al. | 429/206 |
| 2011/0086271 A1* | 4/2011 | Lee | H01M 4/134 429/220 |
| 2011/0177393 A1 | 7/2011 | Park et al. | 429/231.8 |
| 2011/0189510 A1 | 8/2011 | Caracciolo et al. | 429/50 |
| 2011/0189520 A1 | 8/2011 | Carter et al. | 429/107 |
| 2011/0200848 A1 | 8/2011 | Chiang et al. | 429/4 |
| 2011/0229761 A1 | 9/2011 | Cui et al. | 429/218.1 |
| 2011/0274948 A1 | 11/2011 | Duduta et al. | 429/50 |
| 2011/0311888 A1 | 12/2011 | Garsuch | 429/405 |
| 2012/0164499 A1 | 6/2012 | Chiang et al. | 429/81 |
| 2012/0219860 A1 | 8/2012 | Wang et al. | 429/220 |
| 2013/0019468 A1 | 1/2013 | Ramasubramanian et al. | 29/623.1 |
| 2013/0055559 A1 | 3/2013 | Slocum et al. | 29/623.1 |
| 2013/0065122 A1 | 3/2013 | Chiang | 429/211 |
| 2013/0314844 A1 | 11/2013 | Chen et al. | 361/502 |
| 2013/0323581 A1 | 12/2013 | Singh et al. | 429/181 |
| 2013/0337319 A1 | 12/2013 | Doherty et al. | 429/209 |
| 2013/0344367 A1 | 12/2013 | Chiang et al. | 429/101 |
| 2014/0004437 A1 | 1/2014 | Slocum et al. | 429/443 |
| 2014/0030623 A1 | 1/2014 | Chiang et al. | 429/434 |
| 2014/0057171 A1 | 2/2014 | Sohn et al. | H01M 4/386 |
| 2014/0065322 A1 | 3/2014 | Park et al. | 427/569 |
| 2014/0154546 A1 | 6/2014 | Carter et al. | 429/101 |
| 2014/0170498 A1 | 6/2014 | Park | 429/231.8 |
| 2014/0170524 A1 | 6/2014 | Chiang et al. | 429/482 |
| 2014/0234699 A1 | 8/2014 | Ling et al. | 429/188 |
| 2014/0248521 A1 | 9/2014 | Chiang et al. | 429/105 |
| 2014/0255774 A1 | 9/2014 | Singh et al. | 429/200 |
| 2014/0266066 A1 | 9/2014 | Turon Teixidor et al. | 320/137 |
| 2014/0315097 A1 | 10/2014 | Tan et al. | 429/300 |
| 2014/0322595 A1 | 10/2014 | Zhang et al. | 429/188 |
| 2014/1315097 | 10/2014 | Tan et al. | 429/300 |
| 2015/0044553 A1 | 2/2015 | Chen | 429/200 |
| 2015/0099185 A1 | 4/2015 | Joo et al. | H01M 2/1633 |
| 2015/0129081 A1 | 5/2015 | Chiang et al. | H01M 8/188 |
| 2016/0190599 A1 | 6/2016 | Kim et al. | H01M 4/667 |

FOREIGN PATENT DOCUMENTS

| | | | | |
|---|---|---|---|---|
| KR | 2014-0097967 | | 8/2014 | H01M 8/18 |
| SG | 189157 | | 5/2013 | H01L 21/8256 |
| WO | WO2009082631 | | 7/2009 | H01G 9/00 |
| WO | WO 2012/057702 | | 5/2012 | C01B 31/02 |
| WO | WO 2012/138302 | | 10/2012 | C01B 31/04 |
| WO | WO 2014/093876 | | 6/2014 | H01M 4/02 |
| WO | WO 2014/208996 | | 12/2014 | H01M 4/02 |
| WO | WO 2015/038076 | | 3/2015 | B82Y 40/00 |

OTHER PUBLICATIONS

"Design of Highly Integrated Structures with Additive Manufacturing and Composites" pdlz Product Development Group Zurich, accessed Sep. 18, 2015 (2 pgs).

"Lithium-ion battery" Wikipedia page https://wikipedia.org/wiki/Lithium-ion_battery#Materials_of_commercial_cells, Jul. 7, 2015 (27 pgs).

"Ultra-fast charging batteries that can be 70% recharges in just two minutes" Nanyang Tehcnological University, dated Oct. 13, 2014 (3 pgs).

Chandler, David L., "Printing transparent glass in 3-D" MIT News, Sep. 14, 2015 (3 pgs).

Chemical Elements.com "Periodic Table: Transition Metals" accessed Aug. 7, 2015 (1 pg).

*Electrochemistry at the Nanoscale*, edited by Patrik Schmuki, Sannakaisa Virtanen, Google Books print out, accessed Aug. 7, 2015 (1 pg).

Fu, Kun et al., "Aligned Carbon Nanotube-Silicon Sheets: A Novel Nano-architecture for Flexible Lithium Ion Battery Electrodes" *Advanced Materials* ,2013, 25, 5109-5114 (6 pgs).

Galatzer-Levy, Jeanne "Beyond the lithium ion, toward a better performing battery" University of Illinois, Chicago, Apr. 17, 2015 (3 pgs).

(56) References Cited

OTHER PUBLICATIONS

International Preliminary Report on Patentability issued in application No. PCT/US2016/032751, dated Nov. 21, 2017 (5 pgs).
International Search Report and Written Opinion issued in application No. PCT/US2016/032751, dated Sep. 22, 2016 (9 pgs).
IntraMicron web page accessed Sep. 11, 2015 (9 pgs).
Press Trust of India, "Lithium Ion Batteries May Soon Be Replaced With Magnesium Ion Tech" NDTV Gadget Beta, Jul. 8, 2015 (2 pgs).
Tang, Yuxin et al., "Mechanical Force-Driven Growth of Elongated Bending $TiO_2$-based Nanotubular Materials for Ultrafast Rechargeable Lithium Ion Batteries" *Advanced Materials*, 2014, 26, 6111-6118 (8 pgs).
Templeton, Graham, "Magnesium-ion batteries could prove that two electrons are better than one" ExtremeTech.com, Nov. 5, 2014 (4 pgs).
Yarris, Lynn, "Dispelling a Misconception About Mg-Ion Batteries: Supercomputer Simulations at Berkeley Lab Provide a Path to Better Designs" Oct. 16, 2014 (3 pgs).
Zhao, Xin et al., "In-Plane Vacancy-Enabled High-Power Si-Graphene Composite Electrode for Lithium-Ion Batteries" *Advanced Energy Materials*, 1, 2011, p. 1079-1084 (6 pgs).
U.S. Appl. No. 14/871,677, filed Sep. 30, 2015.
European Search Report for corresponding EP Application Serial No. 16797109.2, dated Jan. 4, 2019 (9 pages).

\* cited by examiner

HIGH CAPACITY RECHARGEABLE BATTERIES

The demand for high capacity rechargeable batteries is strong and increasing each year. Many applications, such as aerospace, medical devices, portable electronics, and automotive applications, require high gravimetric and/or volumetric capacity cells. Lithium ion electrode technology can provide significant improvements in this area. However, to date, lithium ion cells employing graphite, is limited to theoretical specific energy density of only 372 mAh/g.

Silicon, germanium, tin, and many other materials are attractive active materials because of their high electrochemical capacity. For example, silicon has a theoretical capacity of about 4200 mAh/g, which corresponds to the $Li_{4.4}Si$ phase. Yet, many of these materials are not widely used in commercial lithium ion batteries. One reason is that some of these materials exhibit substantial changes in volume during cycling. For example, silicon swells by as much as 400% when charged to its theoretical capacity. Volume changes of this magnitude can cause substantial stresses in the active material structures, resulting in fractures and pulverization, loss of electrical and mechanical connections within the electrode, and capacity fading.

Conventional electrodes include polymer binders that are used to hold active materials on the substrate. Most polymer binders are not sufficiently elastic to accommodate the large swelling of some high capacity materials. As a result, active material particles tend to separate from each other and the current collector. Overall, there is a need for improved applications of high capacity active materials in battery electrodes that minimize the drawbacks described above.

The foregoing discussion of the prior art derives from U.S. Pat. Nos. 8,257,866 and 8,450,012 in which the inventors propose addressing the elasticity and swelling problems of prior art materials by providing electrochemically active electrode materials comprising a high surface area template containing a metal silicide and a layer of high capacity active material deposited over the template. The template reportedly serves as a mechanical support for the active material and/or an electrical conductor between the active material and, for example, a substrate. According to the inventors, due to the high surface area of the template, even a thin layer of the active material can provide sufficient active material loading and corresponding electrode capacity per surface area. As such, the thickness of the active material layer may be maintained sufficiently small to be below its fracture threshold to preserve its structural integrity during battery cycling. The thickness and/or composition of the active layer may also be specifically profiled to reduce swelling near the substrate interface and preserve the interface connection.

The present invention overcomes the aforesaid and other disadvantages of the prior art by providing electrodes formed of extremely fine filaments of the valve metal tantalum or other valve metals produced following the teachings of my prior U.S. Pat. Nos. 5,034,857 and 8,673,025, the contents of which are incorporated herein by reference.

In my prior U.S. Pat. No. 5,034,857, I disclose an approach to the production of extremely fine valve metal filaments, such as tantalum, for capacitor use. The benefits of fine filaments relative to fine powders are higher purity, lower cost, uniformity of cross section, and ease of dielectric infiltration, while still maintaining high surface area for anodization. The uniformity of cross section results in capacitors with high specific energy density, lower ESR and ESL, and less sensitivity to forming voltage and sintering temperature as compared to fine powder compacts.

As disclosed in my aforesaid '857 U.S. patent, valve metal filaments, preferably tantalum, are fabricated by combining filaments of the valve metal with a ductile metal so as to form a billet. The second, ductile metal is different from the metal that forms the filaments. The filaments are substantially parallel, and are separated from each other and from the billet surface by the second, ductile metal. The billet is reduced by conventional means—e.g., extrusion and wire drawing—to the point where the filament diameter is in the range of 0.2 to 5.0 microns in diameter. At that point, the second, ductile metal is removed, preferably by leaching in mineral acids, leaving the valve metal filaments intact. The filaments are suitable for use in tantalum capacitor fabrication.

Other patents involving valve metal filaments and fibers, their fabrication, or articles made therefrom include U.S. Pat. No. 3,277,564, (Webber), U.S. Pat. No. 3,379,000 (Webber), U.S. Pat. No. 3,394,213, (Roberts), U.S. Pat. No. 3,567,407 (Yoblin), U.S. Pat. No. 3,698,863 (Roberts), U.S. Pat. No. 3,742,369 (Douglass), U.S. Pat. No. 4,502,884 (Fife), U.S. Pat. No. 5,217,526 (Fife), U.S. Pat. No. 5,306,462 (Fife), U.S. Pat. No. 5,284,531 (Fife), and U.S. Pat. No. 5,245,514 (Fife).

See also my earlier U.S. Pat. No. 5,869,196 in which I describe a process for fabrication of fine-valve metal filaments for use as porous metal compacts used in the manufacture of electrolytic capacitors. According to my '196 U.S. patent, a metal billet consisting of multiple filaments of a valve metal, preferably tantalum, is contained within and spaced apart by a ductile metal, preferably copper. The billet is reduced by conventional means, such as extrusion and wire drawing, the resulting composite product is cut into lengths, and the ductile metal separating the valve metal components is removed by leaching in acid. A similar compaction technique has been proposed to fabricate composites by providing continuous layers of tantalum and copper sheets layered together in a jellyroll. The jellyroll is then reduced to a small size by extrusion and drawing. Starting with sheets of tantalum and copper offers advantages over working with filaments. However, at reduced sizes, the copper cannot readily be leached out due to the presence of the continuous tantalum layers.

Also, in my prior U.S. Pat. No. 8,858,738, I describe improvements over the prior art much as described in my '196 U.S. patent by creating one or more open slots in the starting billet stage and filling the slots with ductile metal prior to extrusion and drawing. After extrusion and drawing to small size, the slots remain. As a result, the ductile metal readily may be leached and removed from between the tantalum layers. The resulting product is a series of compacted tantalum layers each progressively of smaller width. In one embodiment of the invention, continuous layers of tantalum and copper are layered together in a jellyroll and formed into a billet which is circular in cross-section, and the slots are concentrically evenly spaced radially around the billet. The resulting product is a series of concentric split tubes each progressively of smaller diameter towards the center.

As described in my '738 patent, employing a foil or sheet of tantalum as opposed to filaments greatly simplifies assembly of the billet. Employing sheet tantalum also ensures greater uniformity since the thickness of the starting sheet can be controlled more readily than using a multiple of separate filaments. This in turn produces substantially more uniform capacitor material resulting in substantially higher values of CV/g. See also my prior U.S. Pat. No. 8,257,866 and PCT/US2008/086460.

I have now found that electrodes formed of extremely fine valve metal filaments as described in my aforesaid U.S. Patents advantageously may be employed as electrode material for high capacity rechargeable batteries, particularly lithium ion rechargeable batteries.

The present invention in one aspect provides an electrically active electrode material for use with a lithium ion cell, the electrochemically active material electrode material comprising a sheet or mat formed of a valve metal material formed of filaments of a valve metal not larger than about 10 microns in cross section, and coated with an electrochemically active material.

In another embodiment the valve metal is selected from the group consisting of tantalum, niobium, an alloy of tantalum, an alloy of niobium, hafnium, titanium and aluminum In another embodiment the filaments have a thickness of less than about 5-10 microns, preferably below about 1 micron.

In another embodiment the electrochemically active material comprises silicon nanoparticles.

In still yet another embodiment the electrode material is formed into an anode.

The present invention also provides a method of forming an electrode substrate useful for forming a lithium ion battery comprising the steps of:
 (a) establishing multiple components of a valve metal in a billet of a ductile material;
 (b) working the billet to a series of reduction steps to form said valve metal components into elongated elements;
 (c) cutting the elongated elements from step (b) into filaments not larger than about 10 microns, and leaching the ductile material from the elements;
 (d) washing the cut elements from step (c) with water to form a slurry in which the filaments are evenly distributed;
 (e) forming the cut elements from step (d) by casting into a stable mat; and
 (f) coating the mat resulting from step (e) with an electrochemically active material.

In one embodiment the valve metal is selected from the group consisting of tantalum, niobium, an alloy of tantalum, an alloy of niobium, hafnium, titanium and aluminum.

In another embodiment the filaments have a thickness of less than about 5-10 microns, preferably below about 1 micron.

In still another embodiment, the electrochemically active material comprises silicon nanoparticles, germanium or tin.

In still yet another embodiment, the electrically active electrode material is formed into an anode.

The present invention also provides a lithium ion battery comprising an assembly containing an anode and a cathode separated from one another, and an electrolyte, wherein the anode is formed of electrically active electrode material as claimed in claim 1.

In one embodiment, the valve metal is selected from the group consisting of tantalum, niobium, an alloy of tantalum, an alloy of niobium, hafnium, titanium and aluminum.

In another embodiment the filaments have a thickness of less than about 5-10 microns, preferably below about 1 micron.

In still yet another embodiment electrochemically active material comprises silicon nanoparticles.

Further features and advantages of the present invention will be seen from the following detailed description, taken in conjunction with the accompanying drawings, wherein, FIG. 1 is a schematic block diagram of a process for producing electrode material useful in the present invention;

Figure 1:
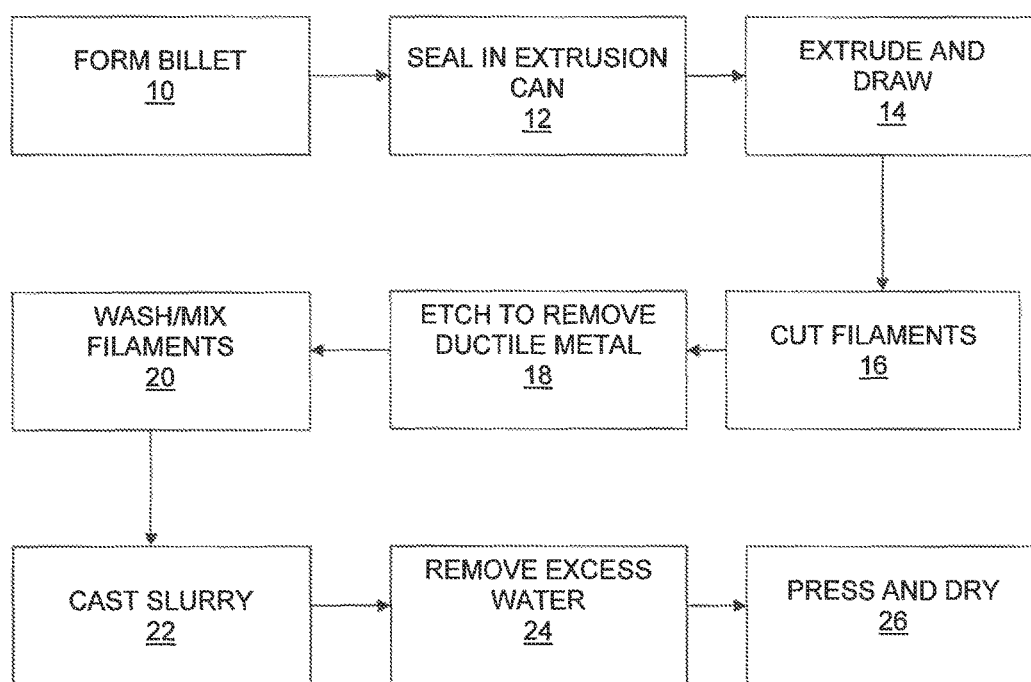
Figure 2:
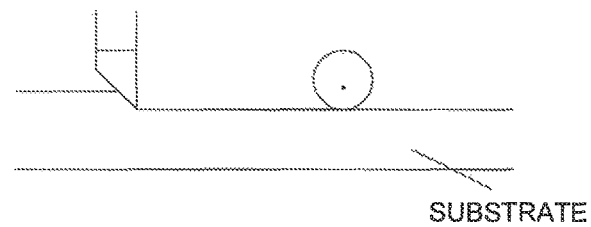
FIG. 2 is a simplified side elevational view showing casting of electrode material useful in accordance with the present invention.

Referring to FIGS. 1 and 2, the production process starts with the fabrication of valve metal filaments, preferably tantalum, by combining filaments or wires of tantalum with a ductile material, such as copper to form a billet at step 10. The billet is then sealed in an extrusion can in step 12, and extruded and drawn in step 14 following the teachings of my '196 U.S. patent. The extruded and drawn filaments are then cut or chopped into short segments, typically ¹⁄₁₆th-¼th inch long at a chopping station 16. Preferably the cut filaments all have approximately the same length. Actually, the more uniform the filament, the better. The chopped filaments are then passed to an etching station 18 where the ductile metal is leached away using a suitable acid. For example, where copper is the ductile metal, the etchant may comprise nitric acid.

Etching in acid removes the copper from between the tantalum filaments. After etching, one is left with a plurality of short filaments of tantalum. The tantalum filaments are then washed in water in a washing station 20, and the wash water is partially decanted to leave a slurry of tantalum filaments in water. The slurry of tantalum filaments in water is then cast as a thin sheet using, for example, a Doctor Blade at casting station 22. Excess water is removed, for example, by rolling at a rolling station 24. The resulting mat is then further compressed and dried at a drying station 26.

As an alternative to "Doctor Blade formation", the thin sheet may be formed by spray casting the slurry onto to a substrate, excess water removed and the resulting mat pressed and dried as before.

There results a highly porous thin sheet of tantalum filaments substantially uniform in thickness.

As reported in my aforesaid PCT application, an aqueous slurry of chopped filaments will adhere together sufficiently so that the fibers may be cast as a sheet which can be pressed and dried into a stable mat. This is surprising in that the metal filaments themselves do not absorb water. Notwithstanding, as long as the filaments are not substantially thicker than about 10 microns, they will adhere together. On the other hand, if the filaments are much larger than about 10 microns, they will not form a stable mat or sheet. Thus, it is preferred that the filaments have a thickness of less than about 10 microns, and preferably below 1 micron thick. To ensure an even distribution of the filaments, and thus ensure production of a uniform mat, the slurry preferably is subjected to vigorous mixing by mechanical stirring or vibration.

The density of the resulting tantalum mat may be varied simply by changing the final thickness of the mat.

Also, if desired, multiple layers may be stacked to form thicker mats 30 that may be desired, for example, for high density applications.

The resulting tantalum mat comprises a porous mat of sub-micron size tantalum filaments in contact with one another, whereby to form a conductive mat.

Figure 3:
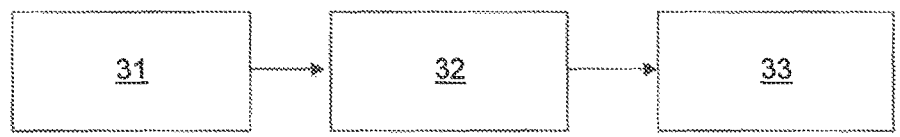
FIG. 3 is a schematic block diagram of a process for producing a battery in accordance with the present invention.
Figures 4, 5:
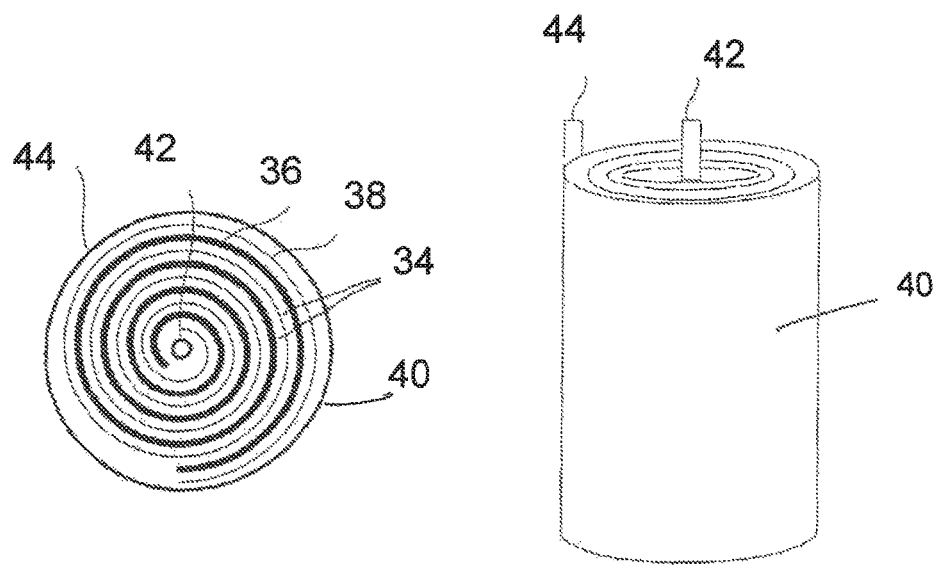
FIG. 4 is a cross-sectional view of a rechargeable battery in accordance with the present invention.
FIG. 5 is a perspective view of a battery made in accordance with the present invention.

Referring to FIGS. 3-5, mats 30 of electrode material produced by the process above described are then coated with a suitable electrochemical active material at coating station 31. For example, in the case of a lithium ion battery, the electrode material forming the mats should be coated with electrochemically active material such as silicon nanoparticles that take and release lithium ions during cycling of the lithium ion cell. The coated mats are then assembled in a stack at an assembly station 32, between separator sheets 34 to form positive (anode) and negative (cathode) electrodes 36, 38. The electrodes 36, 38 and separator sheets 34 are wound together in a jelly roll and inserted in the case 40 with a positive tab 42 and a negative tab 44 extending from the jelly roll in an assembly station 33. The tabs can then be welded to exposed portions of the electrode substrates, and the case filled with electrolyte and the case sealed. The result is a high capacity rechargeable battery in which the electrode material comprises extremely ductile fine metal filaments capable of repeatably charging and drain without adverse affect.

Figure 6:
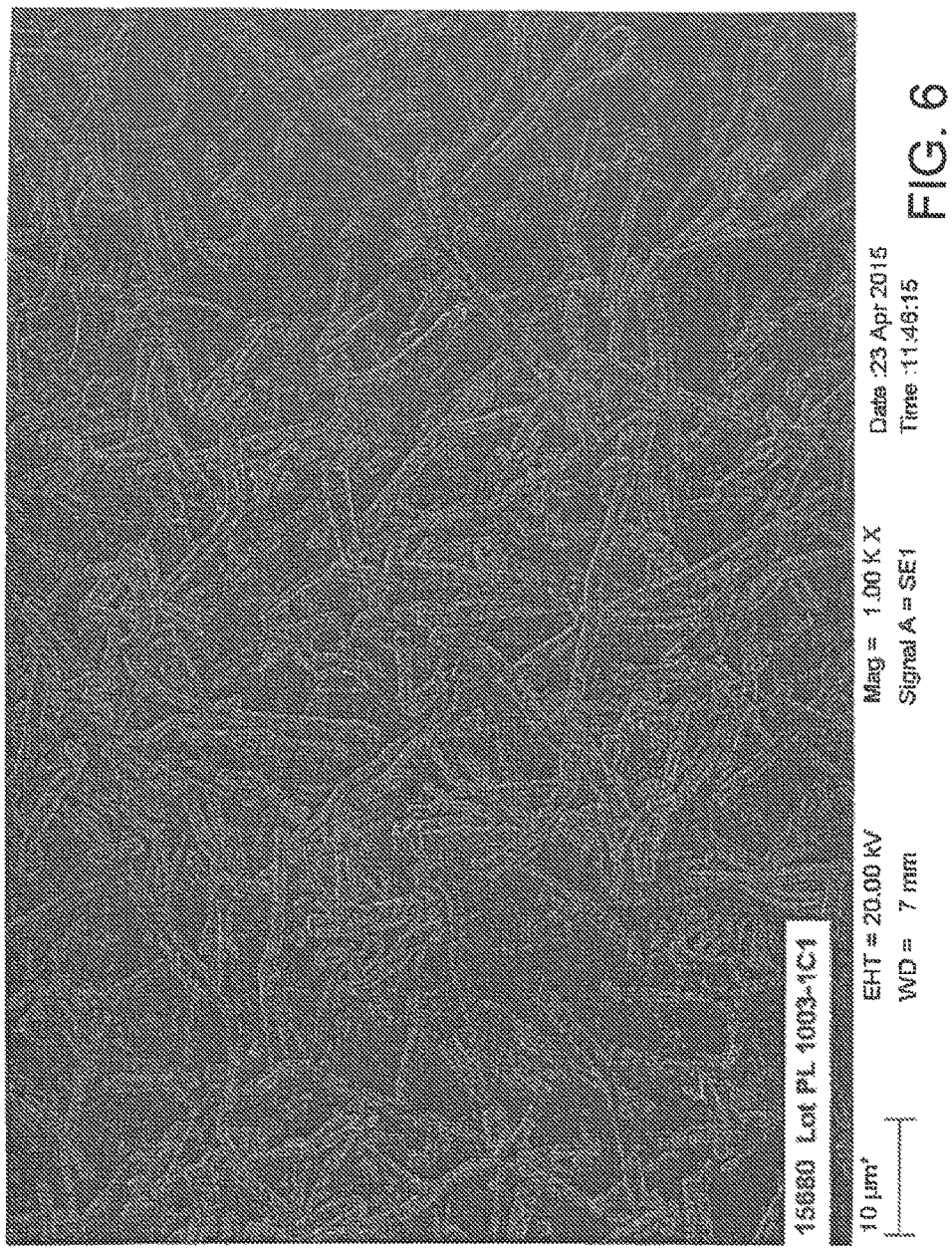
FIGS. 6 and 7 are SEM photographs of Ta filament at different magnification.
Figure 7:
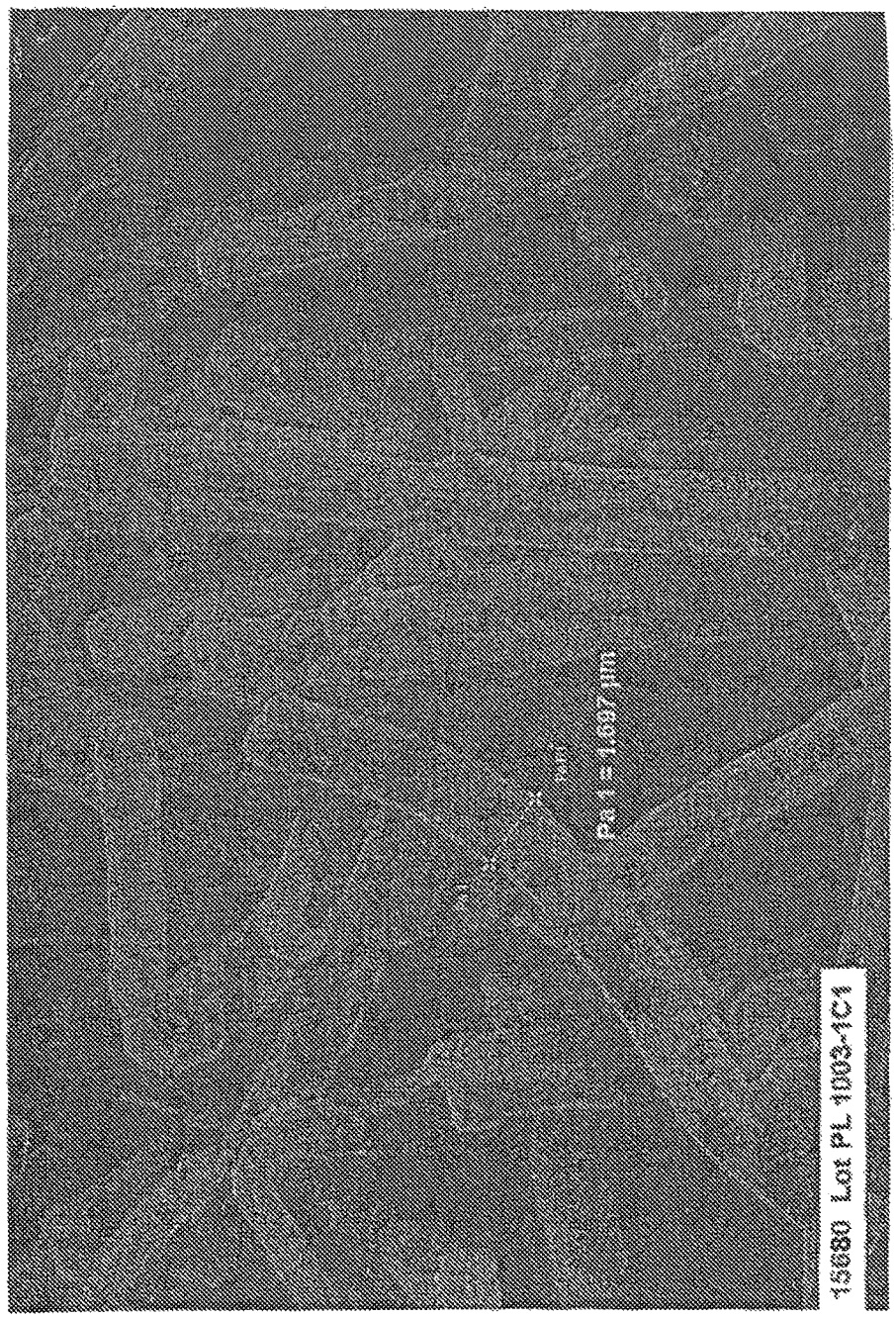

FIGS. 6 and 7 are SEM photographs of Ta filament at different magnification.

While the invention has been described in connection with the use of tantalum disposed within a copper matrix, valve metals other than tantalum, such as niobium, an alloy of tantalum or niobium, hafnium, titanium and its alloys can be used. Similarly, ductile metal matrix materials other than copper, such as copper-based alloys, also may successfully be employed in the practice of the invention. Still other changes may be made without departing from the spirit and scope of the invention.

The invention claimed is:

1. An electrically active electrode material for use with a lithium ion cell, an electrically active electrode substrate material consisting of filaments of a valve metal, selected from the group consisting of tantalum, niobium, an alloy of tantalum, an alloy of niobium, and an alloy of hafnium, not larger than about 10 microns in cross section, which filaments are adhered together to form a stable porous mat formed of randomly oriented filaments in contact with one another, and wherein the filaments of the mat are coated with an electrically active material selected from the group consisting of silicon, germanium and tin.

2. The electrically active electrode material of claim 1, wherein the filaments have a cross section thickness of less than about 5-10 microns.

3. The electrically active electrode material of claim 1, wherein the filaments have a cross section thickness below about 1 micron.

4. The electrically active electrode material of claim 1, wherein the electrochemically active material comprises silicon is in a form of silicon nanoparticles.

5. The electrically active electrode material of claim 1, formed into an anode.

6. A method of forming an electrode substrate as claimed in claim 1 useful for forming a lithium ion battery comprising the steps of:
  (g) establishing multiple components of a valve metal, selected from the group consisting of tantalum, niobium, an alloy of tantalum, an alloy of niobium, and an alloy of hafnium, in a billet of a ductile material;
  (h) working the billet to a series of reduction steps to form said valve metal components into elongated elements;
  (i) cutting the elongated elements from step (b) into filaments not larger than about 10 microns, and leaching the ductile material from the elements;
  (j) washing the cut elements from step (c) with water to form a slurry in which the filaments are evenly distributed;
  (k) casting the cut elements from step (d) into a stable mat; and
  (l) coating the mat resulting from step (e) with electrochemically active material selected from the group consisting of silicon, germanium and tin.

7. The method of claim 6, wherein the filaments have a thickness of less than about 5-10 microns.

8. The method of claim 6, wherein the filaments have a thickness below about 1 micron.

9. The method of claim 6, wherein the electrochemically active material comprises silicon is in a form of silicon nanoparticles.

10. The method of claim 6, formed into an anode.

11. A lithium ion battery comprising a case containing an anode and a cathode separated from one another, and an electrolyte, wherein the anode is formed of electrically active electrode material as claimed in claim 1.

12. The cell of claim 11, wherein the filaments have a cross section thickness of less than about 5-10 microns.

13. The cell of claim 11, wherein the filaments have a cross section thickness below about 1 micron.

14. The cell of claim 11, wherein the electrochemically active material comprises silicon is in a form of silicon nanoparticles.

* * * * *